3,318,719
MANUFACTURE OF AN INFRA-RED REFLECTIVE PIGMENT
Ludwig Wesch, Heidelberg, Germany, assignor, by mesne assignments, to Eltro Gesellschaft mit beschrankter Haftung & Co. Gesellschaft fur Strahlungstechnik, Heidelberg, Germany
No Drawing. Filed July 6, 1955, Ser. No. 520,350
Claims priority, application Germany, July 12, 1954, W 14,403
1 Claim. (Cl. 106—292)

The present invention relates to a process of the manufacture of infra-red reflective materials, to sintered bodies with infra-red reflective characteristics and to materials incorporating such bodies.

The manufacture of pigments with predetermined spectral distribution of infra-red reflection causes considerable technical difficulties, particularly if such pigments are to be thermally stable and resistant to inorganic acids, alkalis and organic chemicals. It is also often desirable for such pigments to have a given color so that they may be used in paints without organic dyes or in cements of all types.

It has been found technically difficult or impossible and/or commercially infeasible to fulfill the above conditions with substances of simple chemical structure, such as the selenides and tellurides.

It is the principal object of the present invention to overcome the above disadvantages and to produce sintered materials of desired infra-red reflectivity and physical characteristics. These novel sintered materials may be composed of cheap and abundant raw materials combined with smaller amounts of substances having good reflectivity in the infra-red range.

In accordance with the invention, inorganic substances, whose infra-red reflectivity need not exceed 20%, are combined with strongly infra-red reflective substances by sintering them together at a temperature of about 200° C. to 2000° C. The sintered products are then finely comminuted to obtain the infra-red reflective pigments of desire reflectivity characteristics.

In this manner, novel materials of 70% infra-red reflectivity at $1\mu$ may be produced, for example, from basic materials, such as cements, having a reflectivity of no more than about 38%, by adding thereto highly reflective substances. Pigments with a maximum reflectivity at $1\mu$, weak reflectivity between 2 and $5\mu$, and good reflectivity at $7\mu$ to more than $10\mu$ may be produced by selecting additive substances which strongly absorb in the close infra-red range but strongly reflect in the farther infra-red range beyond $7\mu$.

The weakly or non-reflective materials capable of being sintered to obtain the products of the present invention may be preferably selected from oxides of aluminum and magnesium.

The above substances are thoroughly mixed with strongly infra-red reflective substances, for instance in a ball mill or like apparatus, and the mixture is subjected to the sintering or annealing process. Depending on the substances and the desired effects, the heating may be continued for one to twenty hours. The homogeneity of the pigments may be considerably improved if the mixture is annealed or sintered twice, or even more frequently, the mixture being comminuted between the successive heatings since the sintering will proceed the more efficiently the finer the grain of the substances.

Preferably, substances are added to the basic materials, which aid the sintering or crystallization process, if the latter takes place. These substances also assure homogeneous distribution of the basic constituents in the sintered product. These additives generally have a low melting point and thus produce contact of the basic materials and their equal distribution early in the sintering process, while at the same time considerably reducing the surface forces during heating of the mixture. A suitable additive substance is magnesium chloride. Generally, the additives may be admixed in an amount of about 0.5 to 35%, preferably about 10%.

After sintering, the sintered material is very finely, preferably colloidally, comminuted. The comminutation may be effected by mechanical means or by cathodic disintegration.

The following example illustrates bodies of the above type, all parts being by weight:

30 parts MgO, 10 parts of ZnS/CdS mixed crystal (in the proportion of 20:80) and 60 parts aluminum oxide are mixed with 10% $MgCl_2$, the mixture is heated at 1000° C., pulverized, and sintered at 1200° C. The sintered body is again finely comminuted. Reflection $0.6-3.5\mu$ good. Color: yellowish.

The sintered infra-red reflective pigments of the present invention may be used in inorganic paints, in inorganic construction materials, in cement layers, etc. to improve their infra-red reflectivity and for purposes of camouflage. They may also be combined with natural and synthetic resins. In view of their high heat resistance, in some instances up to about 1000° C., they make good ingredients for fibre protective paints. They may be added to natural and synthetic lacquers, including silicones, and may be applied as such as a textile finish. They may also be used as fillers for synthetic fibers or rubber. Such materials may be formed into suitable camouflage fabrics with good infra-red reflectivity.

While the invention has been described in conjunction with certain specific examples, it will be clearly understood that various changes and modifications may occur to those skilled in the art without departing from the spirit and scope of the invention as defined in the appended claim.

What is claimed is:

A yellowish pigment produced by heating a mixture of 30 parts by weight of magnesium oxide, 10 parts by weight of a 20:80 ZnS/CdS mixed crystal, 60 parts by weight of aluminum oxide and 10% magnesium chloride at 1000° C., pulverizing the heated mixture, sintering the pulverized mixture at 1200° C. and finely comminuting the sintered body.

References Cited by the Examiner

UNITED STATES PATENTS

| | | | |
|---|---|---|---|
| 1,986,183 | 1/1935 | Bunce et al. | 106—293 |
| 2,056,924 | 10/1936 | Kalber | 106—308 |
| 2,076,984 | 4/1937 | Eggert et al. | 252—301.3 |
| 2,123,698 | 7/1938 | Hanahan et al. | 106—293 |
| 2,126,230 | 8/1938 | Wakenhut | 106—293 |
| 2,166,230 | 7/1939 | Booge et al. | 106—293 |
| 2,615,006 | 10/1952 | Lane | 106—308 |
| 2,687,972 | 8/1954 | Mills et al. | 106—293 |

OTHER REFERENCES

Von Fisher's "Paint and Varnish Technology," New York (1948), pages 232-3.

TOBIAS E. LEVOW, *Primary Examiner.*

WILLIAM G. WILES, LEON D. ROSDOL, ROGER L. CAMPBELL, *Examiners.*

J. J. McKEEVER, O. R. VERTIZ, F. D. WOLFFE, S. F. STONE, J. E. POER, *Assistant Examiners.*